Patented Jan. 19, 1943

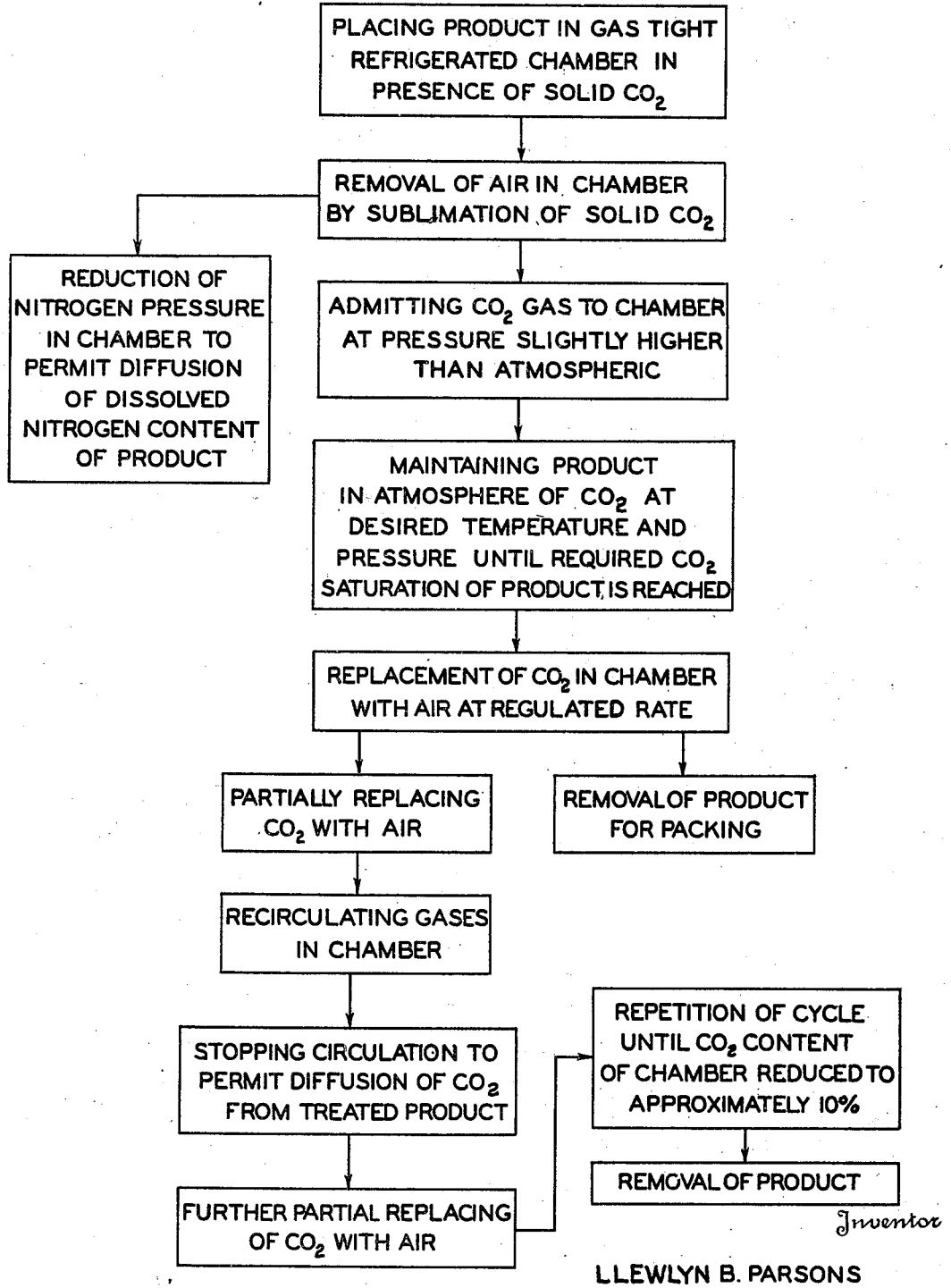

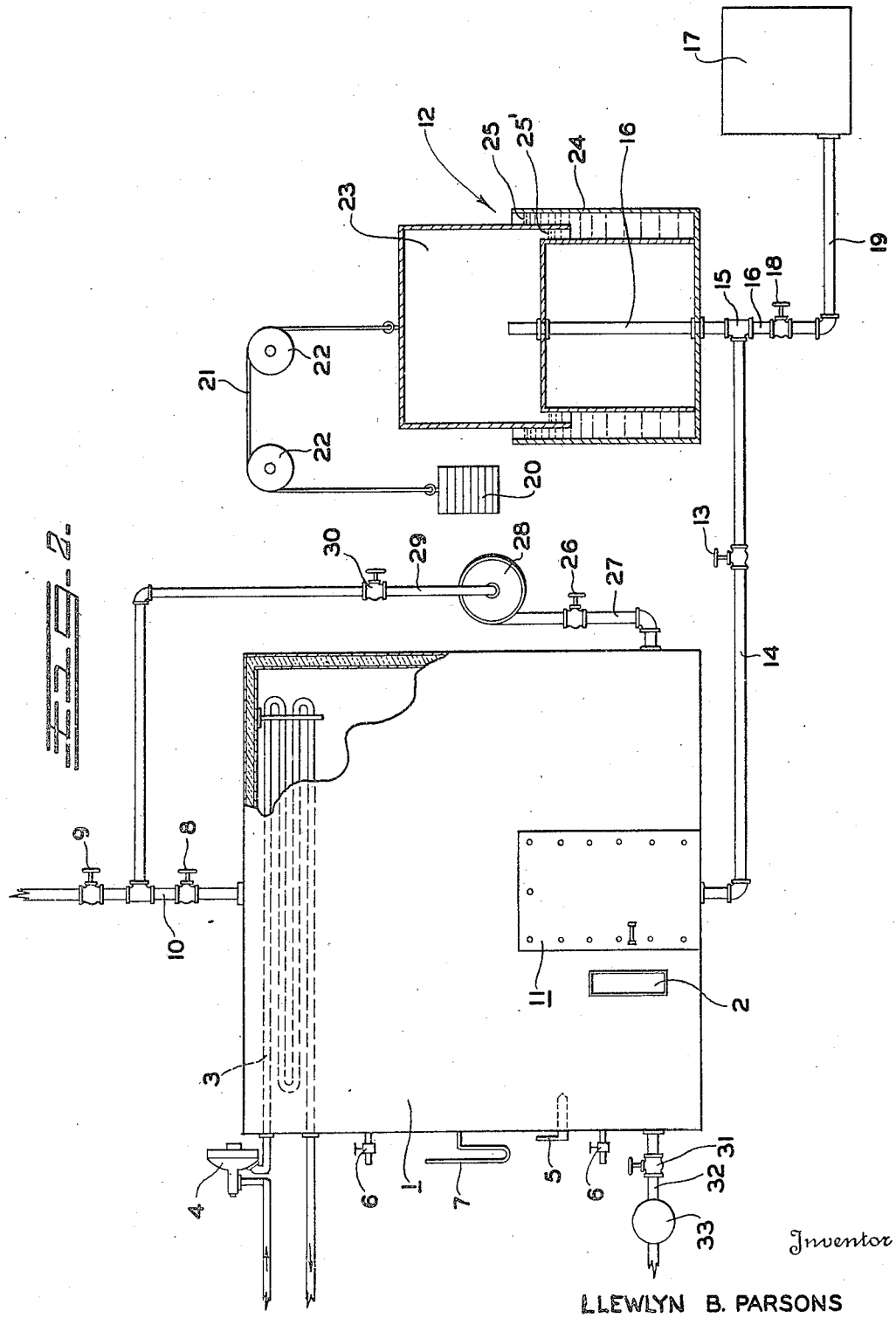

2,309,007

UNITED STATES PATENT OFFICE 2,309,007

APPARATUS FOR PRESERVING FOOD PRODUCTS

Llewellyn B. Parsons, Arlington, Mass., assignor to The Cudahy Packing Company, Chicago, Ill., a corporation of Maine Application February 24, 1939, Serial No. 258,342

2 Claims. (Cl. 99—269)

My invention relates to the preservation of food products, and more particularly to the preservation of animal products having a relatively high percentage of fat, such as bacon, sausage and ham, though it is to be understood that the process has applicability to other foods than cured meats or fat-containing products.

Sausage, ham, bacon and other fat-containing products, when stored in the air, readily lose their original color and flavor, even at relatively low temperatures. This is due primarily to oxidation by the oxygen of the air of the meat pigments and fats present in these products. Oxidation of the fats produces rancidity, and oxidation of the meat pigments causes them to lose their desirable color.

Other undesirable changes take place which result in loss of flavor and aroma, and such deterioration may result from the action of enzymes or micro-organisms.

Deterioration in color and flavor of the product during storage is due, as above pointed out, to the action of oxygen of the air with which these foods are in contact during the storage period before consumption, as well as to the enzymic and micro-organic action just referred to. Refrigeration delays somewhat, but does not prevent, such deterioration. Under ordinary commercial refrigeration conditions an ordinarily good grade of bacon, for example, will in twenty days, or less, reach a very low grade of edibility.

Moreover, meat products dry out and lose moisture during storage unless surrounded by a saturated atmosphere. It is not good practice to store meat in a moisture saturated atmosphere, because this stimulates the growth of molds and yeasts on the surface even at low temperatures.

I have discovered that if bacon, or other similar food products, are stored in an atmosphere of $CO_2$, they may be held at refrigerating temperatures for extremely long periods of time without adverse change in either color or flavor. If the above mentioned meat products be stored in a closed space in an atmosphere of 95–100% carbon dioxide, so that the products are substantially saturated with $CO_2$, the undesirable changes will not take place. Because of the virtual absence of oxygen, the meat pigments and fats will be protected from deleterious change. Moreover, the reduction in pH of the fat resulting from saturation with carbon dioxide (this being due to the acid nature of this gas) has an inhibiting effect on the growth of micro-organisms. The saturated fat further serves as a reservoir of carbon dioxide from which carbon dioxide may be slowly evolved to replace any of the gas lost from a container during storage. It is also possible to maintain a moisture saturated atmosphere in the closed space, since molds and yeasts will not grow in the presence of high concentrations of carbon dioxide. This will prevent shrinkage of the product.

In one form of my process a gas-tight sheet metal chamber of any desired size is constructed, with a door. The door is provided with a gas-tight gasket so that when bolted shut, the door will be sealed gas-tight. The chamber is filled with the meat product. For economy the meat is closely packed in. Three to five times as much solid carbon dioxide as is necessary to fill the chamber with gaseous carbon dioxide is distributed over the floor of the chamber. A vent is left open on the roof of the chamber and the door is sealed.

As the solid carbon dioxide sublimes, the gaseous carbon dioxide formed, because of its high specific gravity, does not readily diffuse into the residual air in the chamber but has the effect of pushing it out through the vent. As the concentration of carbon dioxide increases the dissolved air in the meat diffuses out and the meat becomes saturated with carbon dioxide. When the solid carbon dioxide is completely sublimed, the upper vent is closed. This point can be determined by the disappearance of a frost line on the outer walls of the chamber near the floor.

The upper vent is next closed. The chamber is then connected to a gas holder in which carbon dioxide is maintained under a constant pressure, preferably of a few tenths of a pound per square inch. It is desirable to maintain constant pressure in the chamber, by this means, to prevent strains on the chamber by fluctuations in the pressure on the walls brought about by fluctuations in outside atmospheric pressure. Maintaining a slight positive pressure in the chamber at all times also prevents leakage of air into the chamber in case any minute leaks are present.

To remove the meat from the chamber, the gas holder is disconnected and air is sucked into the chamber by means of a fan. The air is sucked in near the floor and the displaced carbon dioxide is forced out the vent on the roof. This procedure brings about a circulation and mixing of the admitted air with the residual carbon dioxide. Where meat in casings is stored in the chamber, it is necessary to displace the carbon dioxide with air very slowly, since sudden or rapid reduction in the partial pressure of the carbon dioxide will cause the dissolved gas to leave the sausage so rapidly that it will puff or blister the casings.

When the carbon dioxide has been displaced by the air, the door of the chamber can be opened and the meat removed.

It is desirable to fit the chamber with a manometer so that the pressure can at all times be observed. It is also desirable to equip the chamber with sampling cocks, by means of which samples of the gas in the chamber can be withdrawn for analysis.

To prevent the rendering and melting of fat in the meat products, it is desirable to maintain the temperature of the chamber at 55 degrees F. or below.

I have discovered that if bacon, or other similar food products, are stored in an atmosphere of $CO_2$, they may be held at refrigerating temperatures for extremely long periods of time without adverse change in either color or flavor.

In the drawings:

Figure 1 is a flow sheet showing one method of carrying out the process;

Fig. 2 is a diagrammatic view of the apparatus employed.

As illustrated in the flow sheet, Figure 1, the process is carried out by placing the food product in a gas-tight refrigerated chamber in the presence of carbon dioxide. I preferably employ a solid $CO_2$. This solid $CO_2$ is placed in the bottom of the chamber and allowed to sublime. The sublimation of the solid $CO_2$ forces the air out of a vent in the top of the chamber. Because the $CO_2$ is considerably heavier than the air, the air tends to float on the top of the $CO_2$, and is pushed out through the vent. This reduces the partial pressure of air in the chamber and permits diffusing of dissolved nitrogen in the food product. The removal of dissolved oxygen by diffusion is an advantage and prevents an additional reaction of this substance with fat and meat pigments.

Carbon dioxide gas is then admitted to the chamber at a pressure slightly higher than atmospheric to prevent outside atmosphere getting in the chamber. The product is maintained in an atmosphere of $CO_2$ at a desired temperature and pressure. The $CO_2$ substantially saturates the product and the product can be held in the atmosphere of $CO_2$ for a long period of time without deterioration.

In the case of products having a casing, such as sausages, their removal from the chamber presents a definite problem. To remove such product from the chamber, the replacement of $CO_2$ in the chamber is effected by admitting air at a low point in the chamber, which drives the $CO_2$ out. Because the air enters at the lower portion of the chamber, there is a tendency for the $CO_2$ to mix with the air because it is heavier, and this gradually causes the partial pressure of the $CO_2$ to fall. The product may be removed for packing or selling after the $CO_2$ has been gradually reduced to substantially fifteen percent or less of the atmospheric air.

After partially replacing the $CO_2$ with air in the chamber, I in general prefer to circulate the gases in the chamber to permit a complete mixing of the air and the $CO_2$ in the chamber. Preferably I allow the mixture then to stand in the chamber to permit the $CO_2$ in the food product to gradually leave the food product without blistering, as will often happen in a product such as sausage, if the partial pressure of the $CO_2$ in the chamber is too rapidly reduced.

The $CO_2$ is replaced in the chamber by a series of admissions of air, circulation of mixture of gases in the chamber, then admitting more air, allowing the products to stand for a considerable period of time, and then repeating the cycle of admission of air, circulation of mixed gases, and permitting the gases in the chamber to stand.

As before stated, when the $CO_2$ content of the chamber is reduced to approximately fifteen percent, the product may be removed. It will be understood that the process of gradually reducing the $CO_2$ has particular application to products having casings, though this process may be usefully applied to other perishable food products.

Referring particularly to the drawings, I have shown a welded sheet metal storage chamber 1, which is adapted to be covered with insulation except for a glass covered peep aperture 2, which permits the interior of the chamber to be inspected at a low point in the chamber. The storage chamber is fitted with suitable racks (not shown) on which to hang or lay cured meats or other products which are adapted to be treated. A cooling coil 3 to maintain the interior of the chamber at the desired temperature during storage is shown. A valve 4 controls the flow of cooling fluid through the cooling coil 3.

In order to regulate the temperature I have shown a thermometer 5, which gives the interior temperature of the chamber. Sampling cocks 6 are shown at different levels in the chamber so that the gas mixture in the chamber can be withdrawn from time to time to ascertain the percentage composition of the gases. During storage, as before stated, there is supposed to be within the chamber a pressure slightly greater than atmospheric, in order to prevent the gases of the atmosphere from entering the chamber. This desirable, slightly greater than atmospheric pressure will be indicated by a manometer 7.

To inhibit the melting or rendering of the fat of the cured meat and the growth of bacteria, the chamber is held at from approximately 35° to 55° F. For economy of operation, the chamber is filled as full as possible with the food products to be treated. When the chamber has been filled with the food products, such as cured meat, it is desired to open valves 8 and 9 in a line 10 leading from the top of the chamber, which opens to the air, and all other valves are closed. Solid carbon dioxide is then placed in the chamber 1. Approximately one-fourth to one-half pound of dry ice per cubic foot of space in the chamber is placed on the floor. The solubility of $CO_2$ in cured meats is in the order of magnitude of one volume of $CO_2$ to one volume of meat. Therefore, the initial charge of dry ice that is used for purging the chamber depends on the volume of the chamber. Best results in general are obtained by scouring out all but residual traces of oxygen from the product. The preferred practice is to have an atmosphere within the holding chamber of 99 percent $CO_2$, or greater, though good results are obtained from approximately 95 to 100 percent $CO_2$.

Primarily I intend to employ $CO_2$ in this process. However, if carbon dioxide is mixed with an inert gas, by which I wish to be understood as referring to gases non-reactive with the meat or food products being stored, the effective percentage of carbon dioxide may be much lower.

After the dry ice is placed on the floor of the chamber, a door 11 is closed against a gasket and bolted in place, thus making the chamber airtight. The dry ice begins to sublime, and $CO_2$ gas being heavier than the residual gas in the chamber does not tend to mix with the air but pushes it upward in a layer, forcing the air out through line 10 and valves 8 and 9. In order to thoroughly purge the air from the chamber, I provide an excess of dry ice.

Fifty to sixty hours, in general, are required for the complete sublimation of the dry ice, where fifty pound blocks are used. This point can be determined by analysis of the exit gas.

After the sublimation has been completed, valves 8 and 9 are closed and the chamber is connected to a $CO_2$ gas holder 12 by opening a valve 13 in a line 14 which is connected by means of a fitting 15 with a line 16 which leads to the interior of the gas holder 12. $CO_2$ is admitted to 12 from a generator 17 by opening a valve 18 in a line 19. In general $CO_2$ from the generator 17 is obtained by sublimation of solid $CO_2$.

The gas holder 12 is of the customary telescopic type in which the gas pressure is constant and is uninfluenced by fluctuations in atmospheric pressure. Water is the confining liquid. A constant pressure of approximately one-tenth of a pound per square inch is maintained in the chamber 1 and in the gas holder by the counterpoise weight 20, which is supported by a flexible cord 21 that passes over pulleys 22, and is attached to the top of a movable container 23 of the gas holder 12. The movable container 23 is adapted to telescope in a fixed container 24 which holds water, whose levels are indicated by the numerals 25 and 25'.

The small pressure of approximately one-tenth of a pound per square inch in the chamber 1 prevents the air from leaking into the chamber if minute leaks are present. A pressure much greater than this is not only unnecessary but undesirable, as it might cause strains on the seams and walls of the chamber. Pressure in the chamber can be determined by the pressure of the manometer 7. Through sampling cocks 6 samples of the gas can be withdrawn for analysis.

The partial pressure of the nitrogen in the food products is reduced to such a low level by the replacement of the air in the chamber by $CO_2$, that the nitrogen dissolved in the meat gradually diffuses in the free gas space in the chamber and at the same time $CO_2$ is gradually dissolved by the meat until it is substantially saturated.

Because of the high reduction potential in the interior of all meat, there is very little free oxygen present in the meat itself to diffuse into the free gas space. This minute amount of oxygen is uncombined form in the meat, together with the very small amount which escapes purging by the sublimed dry ice, gradually reacts with the meat. The quantity so reacting is so small that it is unable to bring about noticeable deleterious changes in the color or flavor of the meat. The residual nitrogen is, of course, inert. $CO_2$ which dissolves in the meat is constantly being replaced from the gas holder.

Since the chamber and gas holder virtually represent a closed system, loss of weight by shrinkage is negligible. Furthermore, after several weeks, the distribution of moisture in the stored meat reaches an equilibrium condition. For instance, a piece of sausage which may have been dried too rapidly may be hard and crusty on the surface and soft in the inside. After several weeks in the $CO_2$ chamber, the surface will be less hard and crusty and the inside portion will be firmer.

Furthermore, if cured meat items of rather different moisture contents are stored together in the same chamber, there will be an exchange of moisture between them. The drier item takes up moisture at the expense of the more moist item. This can be used to advantage in certain cases. For instance, if a lot of Thuringer-type Cervelat is too moist and soft and a lot of B. C. salami is too dry and hard, the two lots may be stored together. After several weeks' storage, the Thuringer will become firmer and the salami be less hard.

The subsequent storage life of many cured meat items is improved by storage in the $CO_2$ chamber. For example, if a sample of salami which has been held in the $CO_2$ chamber several months is stored on removal from the chamber under the same conditions as a newly-finished sample of salami which has not had the $CO_2$ treatment, the $CO_2$ treated salami will retain its desirable color and be free from mold longer than the untreated sample.

The moisture saturation of the products can be as high as desirable in any particular case, since the growth of molds and yeast has been minimized by my process.

When it is desired to remove the cured meat from the chamber, valve 8 in line 10 is closed; valve 9 is opened, and valve 26 in line 27 is opened. This line 27 leads to a circulating fan 28. Also connected to the circulating fan 28 is a line 29 having a valve 30 therein. The line 27 leads to the bottom of the chamber 1. The line 29 is connected to line 10 between valves 8 and 9. In order to permit the atmospheric air to be drawn into the chamber, a valve 31 in a line 32 leading to the bottom of chamber 1 is opened. The line 32 has a flow meter 33 inserted in the line to indicate the volume of air admitted.

Valves 26 and 30 are now open, the fan 28 is started; valve 31 in line 32 is open and valve 9 in line 10 is open, valve 8 in line 10 being closed. Thus air is sucked in through line 32, the amount of flow being indicated by the flow meter 33, into the chamber 1. The mixture of gases is withdrawn from the chamber 1 through line 27 connected to the bottom of the chamber, and is expelled through lines 29 and 10.

Because the $CO_2$ is heavier than air, the $CO_2$ tends to mingle with the air drawn through the base of the chamber 1 so as to gradually change the mixture of gases within the chamber.

When certain products, particularly cured meat in casings, such as sausage, is held in the chamber, the $CO_2$ must be slowly replaced by air. If the partial pressure of $CO_2$ is reduced too quickly, the dissolved $CO_2$ will diffuse out of the sausage so rapidly that pockets of gas will collect under the casings and blisters will be formed. The rate at which the $CO_2$ can safely be reduced will depend on the permeability of the casings.

The best operating procedure in removing the $CO_2$ from the chamber containing, for instance, sausage, is to admit air at such a rate that about 8-15 percent of the $CO_2$ will be replaced in six to eight hours. Valves 9 and 31 should then be closed and valve 8 be opened, while continuing the operation of the circulating fan 28. This has the effect of circulating and mixing the gases in the chamber. After a few hours of recirculation, it is best to let the system stand for ten to fifteen hours to allow diffusion of $CO_2$ out of the sausage. Valve 8 is then closed and valves 31 and 9 are opened. The fan 28 is again started and 8-15 percent more $CO_2$ is replaced by air as before, and the recirculation is repeated. This whole cycle of operation is repeated until the $CO_2$ in the chamber has been reduced to at least 15 percent, or less. The product can then be removed from the chamber by opening the door 11.

The following tables indicate the conditions of a typical run:

TABLE I—*Log of operation*

| Days | Remarks |
|---|---|
| 0 | Filled with sausage. |
| 1 | Closed with 300 lbs. dry ice. |
| 4 | Connected to gas holder. |
| 114 | Started to exhaust gas. |
| 123 | Opened—sausage removed. |

TABLE II

*Change in weight—123 days storage*

| | Weight in | Weight out | Loss | Loss |
|---|---|---|---|---|
| | Pounds | Pounds | Pounds | Per cent |
| Le Triestine (Italian) salami | 11,532 | 11,474 | 58 | 0.50 |
| B. C. salami | 9,945 | 9,891 | 54 | 0.55 |
| Total | 21,477 | 21,365 | 112 | 0.52 |

TABLE III—*Dry ice used*

| | Pounds |
|---|---|
| Purging chamber | 300 |
| Maintaining chamber | 550 |
| Total | 850 |

As before indicated, the fat of meat products, cured or fresh, under ordinary conditions of storage is subject to atmospheric oxidation. The general process of this oxidation is to produce peroxides by the addition of oxygen at the double bonds or points of unsaturation of the fat molecule. Such peroxides subsequently decompose with a splitting of the fat molecule, yielding long chain aldehydes and many other complex products. The aldehydes are mentioned specifically because they are largely responsible for the characteristic odor and flavor which is known as oxidative rancidity.

The storage of sausage and cured meat products in an atmosphere of substantially 100% $CO_2$ is effective in preventing rancidity for long periods of time. This is because there is no oxygen present to react with the fat. At most, the oxygen content of atmospheres of $CO_2$ commercially attainable in my process is 0.5%. Usually it is lower than this value. The oxygen content of the storage atmosphere tends to diminish to the vanishing point because of the micro-biological action, slow respiration of the meat tissues, and possibly a slight oxidation of the fat content of the meat products. The latter is negligible as judged by the results of storage.

My process not only prevents rancidity of the fat, but preserves the color of the lean meat in the food product, such as bacon.

As has been pointed out previously, it is possible to store meat products in a closed space in $CO_2$, saturated with moisture, and thus prevent the meat from shrinking. This is not possible where the gas in the closed space is saturated air, since molds and other undesirable micro-organisms will grow on the meat. The molds, etc. will not grow in $CO_2$ at the desired concentrations.

It is of great value to minimize shrink for several reasons. First, loss of moisture from meat products, beyond what is normal for particular products, causes injury to eating qualities. Meat which is too dry, or woody, or is crusty on the surface, is, in many cases, not as palatable as meat which is juicier. Furthermore, on drying, the salt in the cured meat is concentrated and may bring about too salty a taste in the product. Secondly, meat which is dried beyond its normal extent may suffer injury to its appearance. It often becomes shriveled and darkened in color. Thirdly, there is a monetary loss involved in shrinkage. When meat is weighed and the weight marked on the label, and then the meat encounters further shrink before being sold, complaints are received from governmental and private sources that full weight is not being sold.

It is to be understood that the process is applicable to and useful for the preservation of a great variety of foodstuffs, and especially adapted to the preservation of those foods which contain substantial quantities of fatty material, since such foods tend to deteriorate as the result of contact with oxygen, and further, since this fatty content when saturated with carbon dioxide acts as a reservoir of that gas during storage.

The process and apparatus herein shown and described are merely illustrative and I desire that I be limited in my protection solely by the scope of the appended claims and the showing of the prior art.

I claim:

1. An apparatus for treating meat products to preserve them from deterioration comprising a treating chamber in which the meat products are adapted to be disposed, a source of inert gas for the chamber, means to maintain the gas at a pressure in excess of atmospheric pressure in the chamber, a gas circulating device for circulating the gases in the chamber, conduits leading from the gas circulating device to the top and bottom of the chamber, and valves to control the flow of gas through the gas circulating device and into the chamber.

2. An apparatus for treating meat products to preserve them from deterioration comprising a treating chamber in which the meat products are adapted to be disposed, a source of inert gas for the chamber, means to maintain the gas at a pressure in excess of atmospheric pressure in the chamber, a fan for circulating the gases in the chamber, conduits leading from the fan to the top and bottom of the chamber, and valves to control the flow of gas through the fan and into the chamber.

LLEWELLYN B. PARSONS.